United States Patent [19]

Kusakabe et al.

[11] Patent Number: 5,217,579
[45] Date of Patent: Jun. 8, 1993

[54] DISTILLATION SYSTEM FOR TREATING WASTE ORGANIC SOLVENT

[75] Inventors: Fumiyuki Kusakabe, Okazaki; Tadao Fujii; Fumio Morishita, both of Toyota; Shiro Ohta, Nishikamo, all of Japan

[73] Assignee: Toyota Kagaku Kogyo Kabushiki Kaisha, Toyota, Japan

[21] Appl. No.: 722,954

[22] Filed: Jun. 28, 1991

[30] Foreign Application Priority Data

Feb. 21, 1991 [JP] Japan .................. 3-49064

[51] Int. Cl.$^5$ .......................... B01D 3/28; B01D 3/30
[52] U.S. Cl. .......................... 202/154; 159/62; 159/25.2; 159/49; 159/DIG. 10; 159/DIG. 23; 202/155; 202/175; 202/236; 202/237; 202/265; 203/78; 203/89; 203/DIG. 9
[58] Field of Search ............. 202/154, 155, 237, 236, 202/185.1, 175, 205, 269, 265; 159/48.1, DIG. 16, 6.2, 2.2, 25.2, DIG. 23, 49, DIG. 10; 203/78, 89, 90, DIG. 9, 72; 366/323, 322; 425/203

[56] References Cited

U.S. PATENT DOCUMENTS

| | | | |
|---|---|---|---|
| 2,574,116 | 11/1951 | Lavigne | 202/154 |
| 2,724,709 | 11/1955 | Spence | 202/154 |
| 2,760,351 | 8/1956 | Schilling | 202/154 |
| 2,895,886 | 7/1959 | Schneider | 202/158 |
| 2,975,108 | 3/1961 | Watt | 202/205 |
| 3,578,071 | 5/1971 | Johnston | 202/205 |
| 3,644,179 | 2/1972 | Knoer et al. | 202/154 |
| 3,797,550 | 3/1974 | Latiner | 159/2.2 |
| 3,878,054 | 4/1975 | Rodgers | 202/205 |
| 4,215,052 | 7/1980 | Schroeder et al. | 549/248 |
| 4,360,484 | 11/1982 | Rubens | 264/321 |
| 4,545,862 | 10/1985 | Gore et al. | 203/10 |
| 4,863,568 | 9/1989 | Wijn | 202/205 |

FOREIGN PATENT DOCUMENTS 042722 5/1988 Japan.

Primary Examiner—Virginia Manoharan

[57] ABSTRACT

A system for continuously recovering renewable volatile compounds by boiling points from waste organic solvent with minimum energy loss, and an improved thin membrane distillation apparatus for efficient distillation of renewable volatile compounds from waste organic solvent and enforced discharge of the residue or sludge. The waste treatment system includes a thin membrane distillation apparatus, a cooling unit, a first distillation unit, and a second distillation unit connected in this sequence. Alternatively, the system includes two thin membrane distillation apparatus, a reduced pressure distillation unit, and a normal pressure distillation unit connected in this sequence. The thin membrane distillation apparatus includes a decompression chamber, a waste inlet, an outlet for volatile compound, an air-tight chamber, and a breaking mechanism with a screw head movable into the air-tight chamber.

4 Claims, 5 Drawing Sheets

PRIOR ART

DISTILLATION SYSTEM FOR TREATING WASTE ORGANIC SOLVENT

BACKGROUND OF THE INVENTION

The present invention relates to a system for treating waste organic solvent, and more particularly to a system for extracting renewable volatile compounds from waste containing organic solvents such as coating material, thinner, and printing ink, and separately recovering the volatile compounds by means of fractional distillation. The invention also pertains to a thin membrane distillation apparatus, incorporated in the treatment system, for recovering renewable volatile compounds from waste.

Several systems have been proposed for recovering renewable volatile compounds from waste containing organic solvents. FIG. 5 shows an example of the prior art systems, in which a mixture of volatile compounds is distilled from a predetermined amount of waste in a distillation unit 225. As occasion demands, the volatile compound mixture is further cooled and heated in another distillation unit 226, thus being recovered by boiling points via a distillation tower 227. In FIG. 5, numerals 228 and 230 denote condensers, 229 and 231 coolers, and 232 a temporary storage tank.

The system above is, however, batch type and thus has some drawbacks; only a predetermined amount of waste can be treated at one time, and the residue has to be scraped off from the distillation unit for each recovery of the volatile mixture. Namely, the prior art system is time-consuming and inefficient. When the plural volatile compounds are recovered together, troublesome separation is required afterwards. Alternatively, when the volatile compounds are recovered by boiling points, each volatile compound recovered is of rather low quality due to insufficient separation.

It has now been found that the application of thin membrane distillation apparatus to the system so as to improve the efficiency of the recovery. Waste is supplied from above a decompression chamber covered with a heating jacket into the decompression chamber, is sprayed onto the wall within the decompression chamber with rotating thin membrane blades. Volatile mixture thus distilled is recovered from the upper end of the decompression chamber while sludge is discharged from the lower end thereof. The thin membrane distillation apparatus generally employs a knocker disposed on the wall in the vicinity of an outlet for improved discharge of sludge.

Sludge from waste containing organic solvents mainly consists of compounds of high viscosity like various resins and pigments, and thus even a small shock prevents smooth discharge.

SUMMARY OF THE INVENTION

One objective of the invention is thus to provide an automated system for continuously recovering renewable volatile compounds by boiling points from waste containing organic solvents.

Another objective of the invention is to provide a further improved system for treating waste organic solvent with minimum energy loss.

A further objective of the invention is to provide an improved thin membrane distillation apparatus for efficient distillation of renewable volatile compounds from waste organic solvent and enforced discharge of the residue or sludge.

The above and other related objectives are realized by a system for treating waste organic solvent, which includes a thin membrane distillation apparatus for distilling a mixture of renewable volatile compounds from waste containing organic solvents, a cooling unit for liquefying the distilled volatile mixture, a first distillation unit for distilling and liquefying volatile compounds with boiling points below a predetermined temperature from the liquefied mixture and discharging the residual as a first residue, and a second distillation unit for distilling and liquefying a volatile compounds with boiling points above the predetermined temperature from the first residue and discharging the residual as a second residue. The thin membrane distillation apparatus, the cooling unit, the first distillation unit, and the second distillation unit are connected in this sequence.

The system of the invention further includes a heat exchanger disposed in between the cooling unit and the first distillation unit.

The system first distills a mixture of volatile compounds from waste organic solvent with the thin membrane distillation apparatus thereof, and then separately recovers the volatile compounds of lower boiling points and higher boiling points with the first and second distillation units. The system continuously and efficiently treats waste and recovers renewable volatile compounds by means of fractional distillation. Accordingly, the volatile compounds distilled are adequately separated from each other and sufficiently pure for reuse.

Another system according to the invention also realizes the above objectives, which includes one or plural thin membrane distillation apparatus for distilling a mixture of renewable volatile compounds from waste containing organic solvents, a reduced pressure distillation unit for removing impurities from the volatile mixture, and a normal pressure distillation unit for separately distilling volatile compounds of lower boiling points and higher boiling points from the purified volatile mixture. The thin membrane distillation apparatus, the reduced pressure distillation unit, and the normal pressure distillation unit are connected in this sequence. When the system includes plural thin membrane distillation apparatus, each outlet for volatile compound in the thin membrane distillation apparatus is directly connected to the reduced pressure distillation unit.

The system first distills a mixture of renewable volatile compounds from waste organic solvent with the thin membrane distillation apparatus thereof, second removes impurities from the distilled volatile mixture with the reduced pressure distillation unit, and then separately recovers the volatile compounds of lower boiling points and higher boiling points with the normal pressure distillation unit. The system applies the reduced distillation unit and thereby does not require cooling and storage of the volatile compounds, thus saving the space. The system can recover renewable volatile compounds with minimum energy loss since it does not need liquefaction.

The thin membrane distillation apparatus used in the system includes a decompression chamber which has plural rotatable thin membrane blades and is covered with a heating jacket, a waste inlet and an outlet for volatile compound disposed on the upper end of the decompression chamber, an air-tight chamber connected to the lower end of the decompression chamber via a valve, an opening formed on the lower end of the air-tight chamber, and a breaking mechanism, disposed below the air-tight chamber, with a screw head movable between the opening and the air-tight chamber.

The breaking mechanism with the screw head splits up and scrapes off sludge from the air-tight chamber. The screw head cuts the center of the sludge up upon insertion and scrapes off the divided sludge upon drawing off. The surrounding sludge flows into the cavity formed on the center thereof. Substantially all the sludge is removed by repeated operation of the screw head.

BRIEF DESCRIPTION OF THE DRAWINGS

The invention may be best understood by referring to the following detailed description of the preferred embodiments and the accompanying drawings, wherein like numerals denote like elements and in which.

DETAILED DESCRIPTION OF PREFERRED EMBODIMENTS

Figure 1:
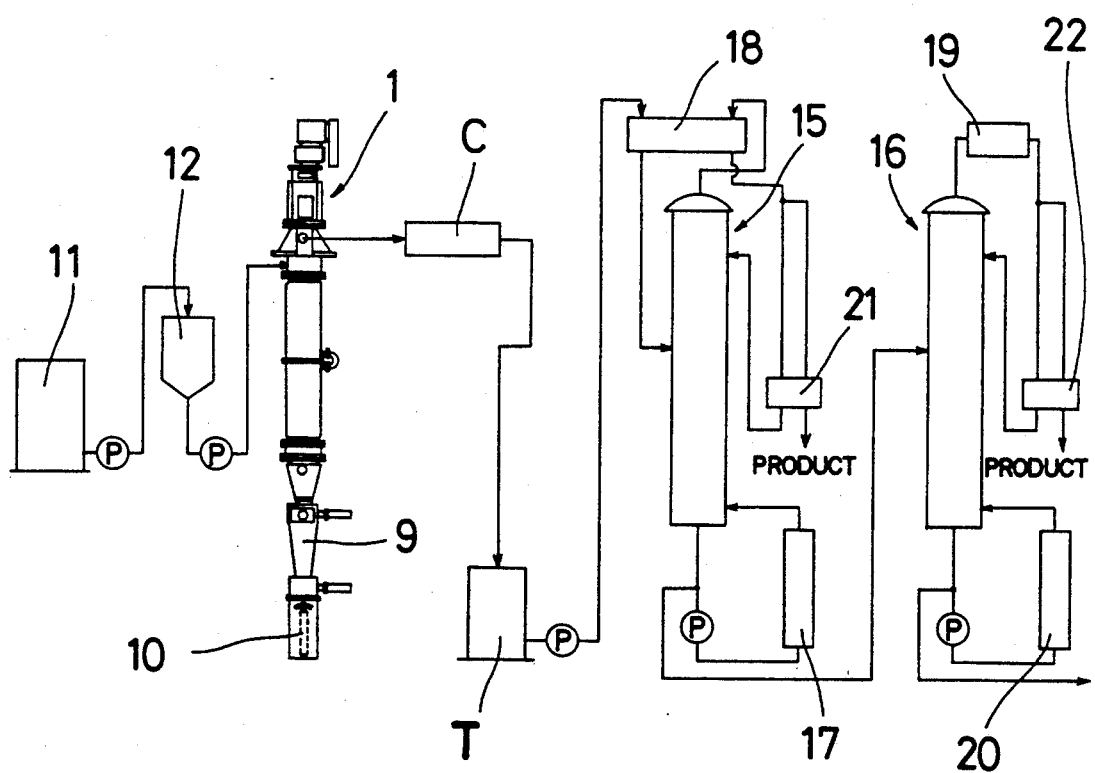
FIG. 1 is a block diagram illustrating a system for treating waste organic solvent of a first embodiment according to the invention.
Figure 2:
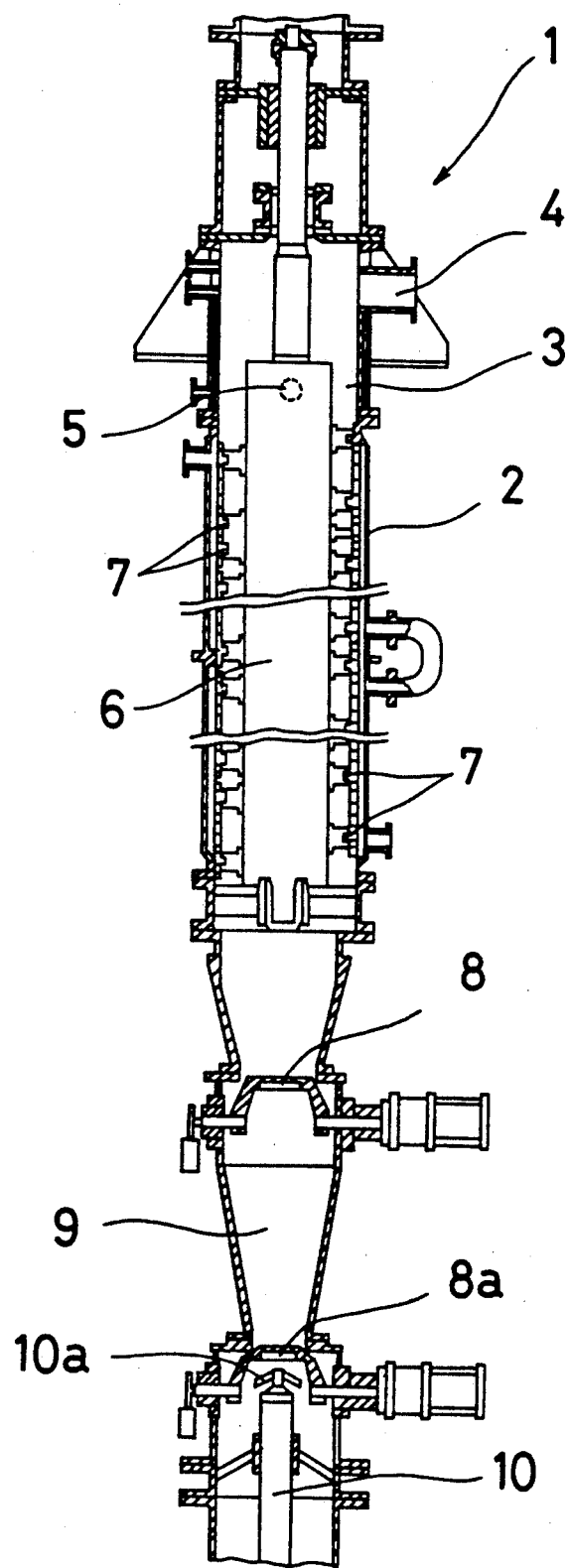
FIG. 2 is a cross sectional view illustrating the structure of the thin membrane distillation apparatus incorporated in the system of FIG. 1.
Figure 3:
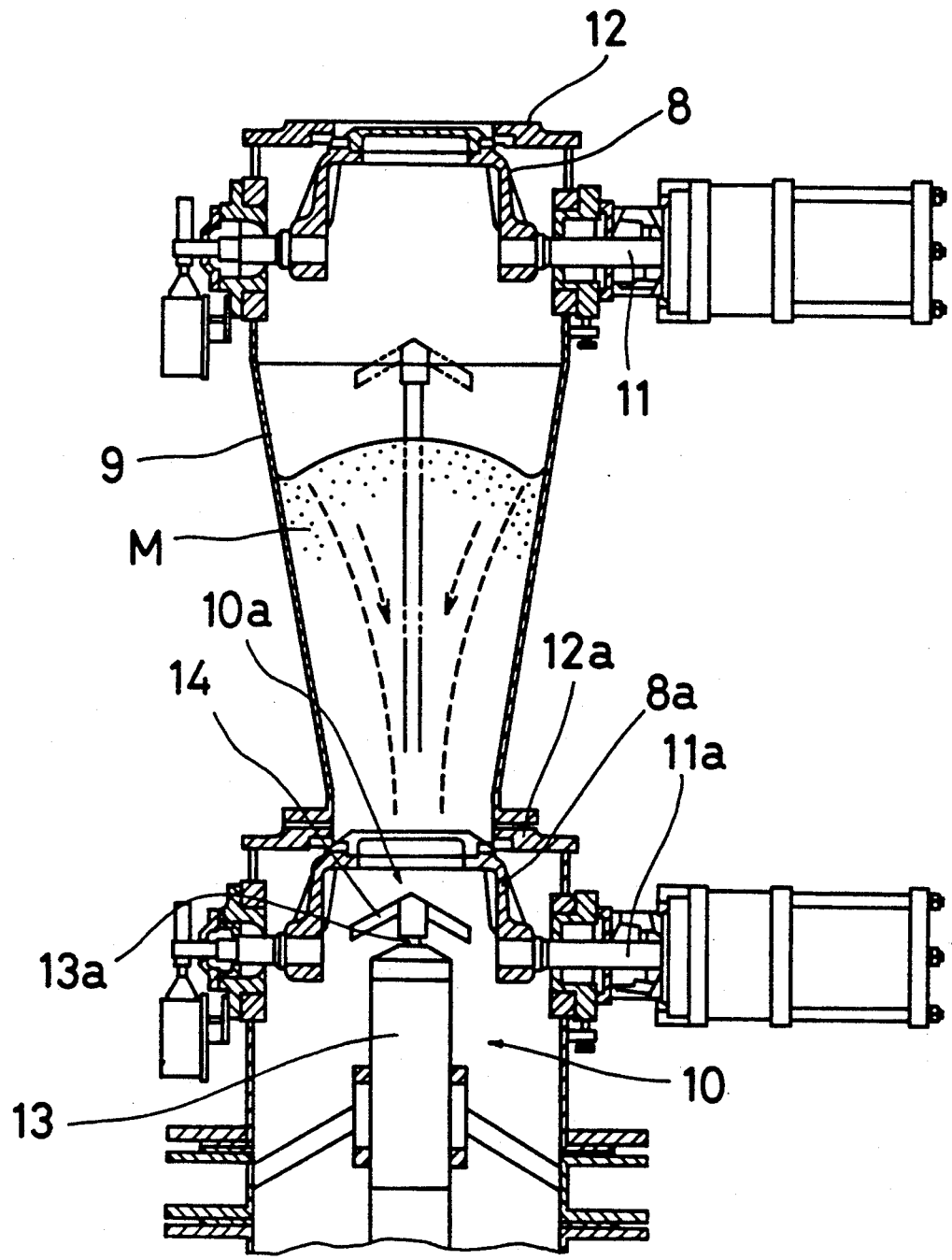
FIG. 3 is an enlarged cross sectional view illustrating the sludge discharge mechanism of the thin membrane distillation apparatus of FIG. 2.

A system for treating waste organic solvent of a first embodiment according to the invention is now explained based on FIGS. 1, 2, and 3. The waste treatment system includes a thin membrane distillation apparatus 1 as seen in FIG. 1. The thin membrane distillation apparatus 1, as shown in FIG. 2, a cylindrical decompression chamber 3 covered with a heating jacket 2, an outlet 4 for volatile compound disposed on the upper end of the decompression chamber 3, and a waste inlet 5 disposed below the outlet 4. The decompression chamber 3 has a through rotational axis 6 driven by a motor (not shown) disposed on the upper end of the apparatus 1. The rotational axis 6 is provided with plural thin membrane blades 7,7 extending radially therefrom. An air-tight chamber 9 is connected to the lower end of the decompression chamber 3 via a valve 8. The hopper like air-tight chamber 9 has a valve 8a on the lower end thereof and opens to the outer atmosphere. A breaking mechanism 10 with a screw head 10a is further attached below the air-tight chamber 9. The screw head 10a is movable to the open air-tight chamber 9 so as to cut up sludge heaped up in the air-tight chamber 9. The mechanism for discharging sludge is later explained in detail.

The waste inlet 5 is connected to a waste tank 11 via a preheating tank 12. Waste organic solvent is supplied into the inlet 5 from the waste tank 11 via piping. The outlet 4 for volatile compound is connected to a cooling unit C through a pipe. The cooling unit C for liquefying a volatile mixture sent from the thin membrane distillation apparatus 1 is joined to a temporary storage tank T, which is further connected to multi-step distillation units 15 and 16.

The distillation units 15 and 16 divide the liquefied volatile mixture into volatile compounds with boiling points below a predetermined temperature which are recovered from the upper end thereof and a volatile mixture with higher boiling points which are discharged from its lower end.

Part of the volatile compounds with lower boiling points separated by the distillation unit 15 condense as final products while the rest is refluxed into the distillation unit 15 for further condensation and purification. On the other hand, part of the volatile mixture with higher boiling points is sent to the distillation unit 16 whereas the rest is heated by a re-boiler 17 and fed back to the distillation unit 15. The distillation unit 15 is further connected to a heat exchanger 18 for exchanging heat between the liquefied volatile mixture from the cooling unit 13 and the volatile compounds from the distillation unit 15.

Part of the volatile compounds with lower boiling points separated by the distillation unit 16 pass through a cooling unit 19 to condense as final products while the rest is refluxed into the distillation unit 16 for further condensation and purification. On the other hand, part of the volatile mixture with higher boiling points is discharged whereas the rest is heated by a re-boiler 20 and fed back to the distillation unit 16. The distillation units 15 and 16 respectively have flow meters 21 and 22.

In the system for treating waste organic solvent thus constructed, waste organic solvent stored in the waste tank 11 is heated in the preheating tank 12 and fed into the thin membrane distillation apparatus 1 by a predetermined amount with a pump. The thin membrane distillation apparatus 1 separates a volatile mixture from sludge. The heated waste organic solvent fed into the decompression chamber 3 is sprayed onto the inner wall of the chamber 3 with the rotating thin membrane blades 7,7. A mixture of volatile compounds are evaporated and recovered through the outlet 4 for volatile compound. The solid residue on the inner wall of the decompression chamber 3 is fallen down to the air-tight chamber 9 at regular intervals and piles as sludge in the air-tight chamber 9.

The volatile mixture is liquefied by the cooling unit C and fed into the distillation unit 15. The distillation temperature of the distillation unit 15 is set at a lower temperature than the distillation unit 16. Accordingly, volatile compounds with low boiling points are recovered from the liquefied volatile mixture in the distillation unit 15 and those with higher boiling points are further recovered from the residue in the distillation unit 16.

When a predetermined amount of sludge M piles in the air-tight chamber 9, the valve 8 between the decompression chamber 3 and the air-tight chamber 9 is closed. The air-tight chamber 9 is then filled with nitrogen gas of atmospheric pressure. The sludge pile M is observed through a view window (not shown). The sludge M is then discharged by opening the valve 8a, which connects the air-tight chamber 9 to the outer atmosphere. Since natural falling of the sludge takes a lot of time, the breaking mechanism 10 is driven here.

The breaking mechanism 10 is now described in detail according to FIG. 3. The valves 8 and 8a pivotably rotate around vertically movable rotational axes 11 and 11a. A vertical movement of the rotational axis 11 or 11a separates the valve 8 or 8a from a valve seat 12 or 12a, and a rotation horizontally moves the valve 8 or 8a. The breaking mechanism 10 has the screw head 10a with blades 14, 14 projecting crisscross, which is attached to the edge of a rod 13a of a vertically disposed cylinder 13. The screw head 10a moves into and from the air-tight chamber 9 on opening of the valve 8a.

The breaking mechanism or the sludge discharge mechanism 10 thus constructed works as follows. The screw head 10a of the breaking mechanism 10 cuts the center of the sludge M up upon insertion into the air-tight chamber 9 and scrapes off the divided sludge upon drawing out of the chamber 9. The surrounding sludge M then flows into the cavity formed on the center thereof. Substantially all the sludge M is removed by repeated operation of the screw head.

The system of the first embodiment is well applied to, for example, treatment of waste solution produced by rinsing the surface of coated automobiles. A mixture of volatile compounds with lower boiling points including methyl alcohol, acetone, ethyl acetate, and toluene is recovered from the distillation unit 15 while a volatile mixture with higher boiling points including methyl isobutyl ketone, xylole, n-butyl alcohol, butyl acetate and aromatic compounds from the distillation unit 16.

The thin membrane distillation apparatus 1 of the embodiment attains improved recovery of volatile compounds by approximately 20%, and moreover improves the operation efficiency and saves the operation time due to its continuous system. Sludge is treated as combustible to be burned off because of the reduced content of organic solvents, thus reducing the labor and time for waste treatment.

Although the system of the embodiment includes two distillation units, it may include three or more distillation units for dividing a volatile mixture into many distillates.

The breaking mechanism may have a foldable head or a head of another shape like mushroom instead of the screw head. The breaking mechanism may be driven by an actuator instead of the cylinder.

The system of the first embodiment efficiently divides waste organic solvent into a mixture of volatile compounds and sludge with the thin membrane distillation apparatus. The volatile mixture is then separately recovered by boiling points with the two distillation units. The system continuously treats waste and recovers renewable volatile compounds, thus improving the operation efficiency and shortening the operation time.

Figure 4:
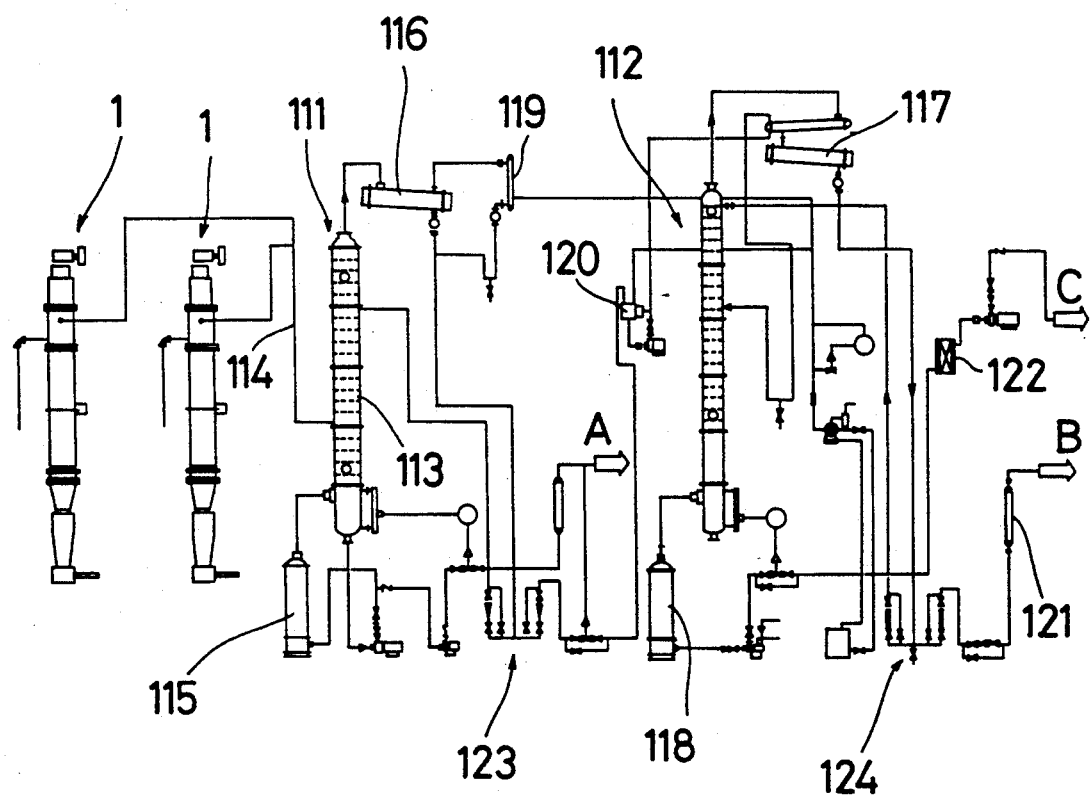
FIG. 4 is a schematic view illustrating a system for treating waste organic solvent of a second embodiment according to the invention.
Figure 5:
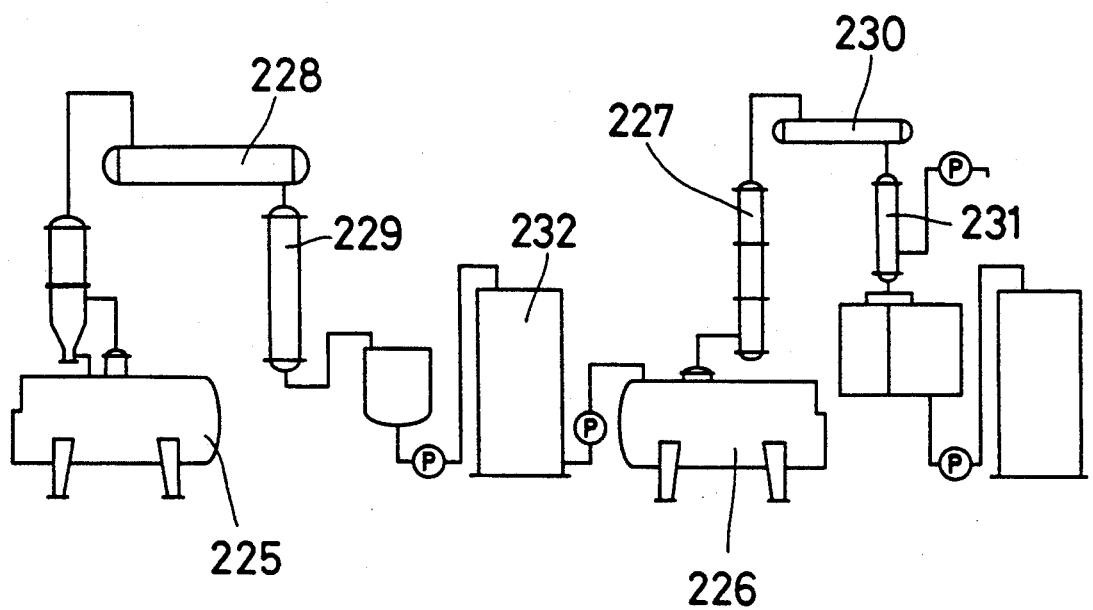
FIG. 5 is a block diagram showing a prior art waste treatment system.

A system for treating waste organic solvent of a second embodiment according to the invention is now explained based on FIG. 4.

The system of the second embodiment includes two thin membrane distillation apparatus 1,1 of the same structure and functions the first embodiment. The thin membrane distillation apparatus 1,1 are connected to a multi-stage pressure distillation unit 111 with a decompression chamber 113 and a multi-stage normal pressure distillation unit 112.

The distillation units 111 and 112 respectively include a multi-stage tower, and divide a volatile mixture into volatile compounds with boiling points below a predetermined temperature which are recovered from the upper end of the tower and a volatile mixture with higher boiling points which are discharged from its lower end.

Waste organic solvent is supplied into the thin membrane distillation apparatus 1 from a waste tank (not shown) via a preheating tank (not shown). The outlet 4 for volatile compound of each of the thin membrane distillation apparatus 1 is directly connected to the decompression chamber 113 of the reduced pressure distillation unit 111 through a pipe 114. The volatile mixture from the thin membrane distillation apparatus 1 is thus directly fed into the decompression chamber 113 of the distillation unit 111.

The reduced pressure distillation unit 111 removes impurities from the volatile mixture. Part of the impurities are heated by a reboiler 115 and fed back to the reduced pressure distillation unit 111 while the rest is discharged as a residue A. Part of the purified volatile mixture is condensed by a condenser 116 and fed into the normal pressure distillation unit 114 while the rest is refluxed into the reduced pressure distillation unit 113 for further purification. The condensed volatile mixture sent to the normal pressure distillation unit 114 is recovered by boiling points by means of fractional distillation. Namely, volatile compounds with lower boiling points are recovered as a product B and those with higher boiling points as a product C. Part of each distillate is fed back to the normal pressure distillation unit 114 through a condenser 117 and a reboiler 118. The system further includes a condenser 119, a cushion tank 120, coolers 121 and 122, and flow meters 123 and 124.

In the system for treating waste organic solvent thus constructed, waste organic solvent stored in the waste tank is heated in the preheating tank and fed into the thin membrane distillation apparatus 1 by a predetermined amount with a pump. The thin membrane distillation apparatus 1 separates a volatile mixture from sludge. Sludge is continuously fallen down to the air-tight chamber 9 to pile therein, and discharged as waste plastic from the air-tight chamber 9 at regular intervals. On the other hand, the volatile mixture is fed into the decompression chamber 113 of the reduced pressure distillation unit 111 at a temperature of, e.g., 90 C. through 95 C.

The distillation temperature of the decompression chamber 113 of the distillation unit 111 is set, for example, at 85 C. through 90 C. The volatile mixture is here divided into the impurities or residue A and a mixture of volatile compounds. The temperature of the volatile mixture can be maintained due to the removal of impurities at this stage.

The purified volatile mixture is then fed into the normal pressure distillation unit 112 for fractional distillation. The distillation temperature is, for example, set at 104 C. through 107 C.

The total energy required for treating 10 kiloliter of waster organic solvent by the system of the second embodiment is as little as 1.7 million kilocalories (equivalent to 150 liters of kerosene) while the same by the conventional system is approximately 1.6 times or 2.7 million kilocalories. This is because the volatile mixture is fed into the distillation units in the gas state, thereby consuming only a little thermal energy. The system of the second embodiment requires neither cooling nor storage, thus saving the space.

Although the system of the second embodiment includes two thin membrane distillation apparatus and two distillation units, it may include three or more thin membrane distillation apparatus and distillation units for dividing a volatile mixture into many distillates.

The system first divides waste organic solvent into a mixture of renewable volatile compounds and sludge containing very little organic solvent with the thin membrane distillation apparatus, second removes impurities from the distilled volatile mixture with the reduced pressure distillation unit, and then recovers the volatile compounds by means of fractional distillation with the normal pressure distillation unit. The system of the second embodiment can recover renewable volatile compounds at improves operation efficiency with minimum energy loss.

Since there may be many other modifications and changes without departing from the scope of the invention, the embodiments above are not intended to limit the invention to the embodiments but are intended to illustrated the invention more clearly.

What is claimed is:

1. In a system for treating liquid waste containing organic solvent to recover volatile compounds from said waste, said system having at least one distillation element for distilling a mixture of volatile compounds from said waste, the improvement wherein
    A. said at least one distillation element comprises
        (i) a decompression chamber having an upper end and a lower end and tubular walls at which compounds vaporize,
        (ii) an inlet for receiving said waste and an outlet for releasing said vaporized compound, and
        (iii) a rotating member within said decompression chamber having radially extending blades for spraying onto the interior of said tubular walls said waste received at said inlet,
    B. said system further comprises
        (i) a reduced pressure fractional distillation means coupled to said at least one distillation element for removing impurities from said distilled volatile mixture,
        (ii) a normal pressure fractional distillation means coupled to said reduced pressure fractional distillation means for separately distilling from a purified volatile mixture volatile compounds of lower boiling points and volatile compounds of higher boiling points,
        (iii) an airtight chamber connected to the lower end of said decompression chamber via a first valve, and
        (iv) a breaking mechanism having a breaking head movable from a position outside said airtight chamber to a position within said airtight chamber.

2. In a system according to claim 1, the improvement wherein said reduced pressure fractional distillation means further includes means forming another decompression chamber arranged for directly receiving said distilled volatile mixture from said at least one distillation element.

3. In a system according to claim 1, the improvement wherein at least one of said reduced pressure fractional distillation means and said normal pressure fractional distillation means includes means for refluxing a portion of said purified volatile mixture by removing said portion of said purified volatile mixture from said at least one fractional distillation means, passing said removed portion of said purified volatile mixture from said at least one fractional distillation means through a cooling means, and returning said removed portion of said purified volatile mixture from said at least one fractional distillation means to said at least one fractional distillation means for further purification and distillation.

4. In a system according to claim 17, wherein said breaking mechanism further comprises means forming a cylinder having a central rod which alternately moves into said airtight chamber and out of said airtight chamber, and said breaking head comprises a screw head located on top of said rod having criss-crossing blades.

* * * * *